United States Patent
Philippe et al.

(10) Patent No.: US 12,160,325 B2
(45) Date of Patent: Dec. 3, 2024

(54) ELECTRONIC ARCHITECTURE FOR ONBOARD SYSTEM

(71) Applicants: COMMISSARIAT A L'ENERGIE ATOMIQUE ET AUX ENERGIES ALTERNATIVES, Paris (FR); RENAULT, Boulogne Billancourt (FR)

(72) Inventors: Jean-Marc Philippe, Gif-sur-Yvette (FR); Alexandre Carbon, Massy (FR); Raphaël David, Bures-sur-Yvette (FR); Nicolas Ventroux, Gif-sur-Yvette (FR); Robert Faure, Le Plessis-Robinson (FR); Laurent Forgeot, Arradon (FR); Laurent Le Garff, Viroflay (FR); Jean-Yves Stineau, Montigny le Bretonneux (FR)

(73) Assignees: COMMISSARIAT A L'ENERGIE ATOMIQUE ET AUX ENERGIES ALTERNATIVES, Paris (FR); RENAULT, Boulogne Billancourt (FR)

( * ) Notice: Subject to any disclaimer, the term of this patent is extended or adjusted under 35 U.S.C. 154(b) by 149 days.

(21) Appl. No.: 17/416,341

(22) PCT Filed: Dec. 9, 2019

(86) PCT No.: PCT/EP2019/084264
§ 371 (c)(1),
(2) Date: Jun. 18, 2021

(87) PCT Pub. No.: WO2020/126624
PCT Pub. Date: Jun. 25, 2020

(65) Prior Publication Data
US 2022/0086021 A1    Mar. 17, 2022

(30) Foreign Application Priority Data
Dec. 20, 2018 (FR) ...................................... 1873551

(51) Int. Cl.
*H04L 12/40* (2006.01)

(52) U.S. Cl.
CPC .. *H04L 12/40078* (2013.01); *H04L 12/40169* (2013.01); *H04L 2012/40273* (2013.01)

(58) Field of Classification Search
CPC ......... H04L 12/40078; H04L 12/40169; H04L 2012/40273
See application file for complete search history.

(56) References Cited

U.S. PATENT DOCUMENTS

| 7,668,991 B2* | 2/2010 | Kopplin | ............... H04L 12/403 710/9 |
| 2004/0002794 A1* | 1/2004 | Pillar | ...................... B65F 3/045 701/1 |

(Continued)

FOREIGN PATENT DOCUMENTS

| EP | 2 670 087 A1 | 12/2013 |
| JP | 2006-51922 A | 2/2006 |

(Continued)

OTHER PUBLICATIONS

Sommer, et al., "RACE: A Centralized Platform Computer Based Architecture for Automotive Applications", 2013 IEEE International Electric Vehicle Conference (IEVC), 2013.

(Continued)

*Primary Examiner* — Henry Tsai
*Assistant Examiner* — Harry Z Wang
(74) *Attorney, Agent, or Firm* — BakerHostetler

(57) ABSTRACT

The electronic architecture carries out the management of the functions of a vehicle, the functions being implemented via a set of sensors and actuators, the architecture comprising at least: a central computer; a real-time communication network; a set of interface modules, each module: aggregating signals from at least one of the sensors and sending (Continued)

the signals to the central computer via the communication network; and/or distributing control signals to at least one of the actuators; the central computer driving the actuators according to the signals from the sensors, the control signals for the actuators being sent to the interface modules via the communication network.

16 Claims, 10 Drawing Sheets

(56) References Cited

U.S. PATENT DOCUMENTS

| | | | | |
|---|---|---|---|---|
| 2004/0123012 | A1* | 6/2004 | Ellerbrock | H04L 25/4904 |
| | | | | 710/305 |
| 2006/0190155 | A1* | 8/2006 | Meyer | B60W 50/0098 |
| | | | | 701/54 |
| 2007/0113070 | A1* | 5/2007 | Lackritz | H04L 9/0838 |
| | | | | 713/151 |
| 2012/0109424 | A1 | 5/2012 | Fervel et al. | |
| 2014/0107932 | A1* | 4/2014 | Luna | G16H 50/20 |
| | | | | 702/19 |
| 2014/0133350 | A1* | 5/2014 | Triess | H04L 69/18 |
| | | | | 370/254 |
| 2016/0304038 | A1* | 10/2016 | Chen | B60R 16/023 |
| 2017/0372535 | A1* | 12/2017 | Miller | G07C 5/02 |
| 2018/0237039 | A1* | 8/2018 | Mong | B61L 23/005 |
| 2018/0300964 | A1* | 10/2018 | Lakshamanan | G06F 9/5027 |
| 2019/0126859 | A1* | 5/2019 | Parmar | H04L 12/40189 |
| 2019/0191015 | A1* | 6/2019 | Tessiore | H04L 67/10 |

FOREIGN PATENT DOCUMENTS

| | | |
|---|---|---|
| WO | 2004/037599 A1 | 5/2004 |
| WO | 2007/053256 A1 | 5/2007 |

OTHER PUBLICATIONS

Stahle, et al., "Towards the deployment of a centralized ICT architecture in the automotive domain", 2013 2nd Mediterranean Conference on Embedded Computing (MECO), Jun. 2013.

English Translation of the Notice of Reasons for Rejection issued in Japanese Patent Application No. 2021-536065 dated Dec. 11, 2023.

* cited by examiner

ELECTRONIC ARCHITECTURE FOR ONBOARD SYSTEM

CROSS-REFERENCE TO RELATED APPLICATIONS

This application is a National Stage of International patent application PCT/EP2019/084264, filed on Dec. 9, 2019, which claims priority to foreign French patent application No. FR 1873551, filed on Dec. 20, 2018, the disclosures of which are incorporated by reference in their entirety.

FIELD OF THE INVENTION

The present invention relates to an electronic architecture for an onboard system. In particular, it applies to a system for managing the functions of a motor vehicle. It notably applies to all types of motor vehicles and applies more generally to any distributed cyber-physical system.

BACKGROUND

The main objective of the electronic architecture of a motor vehicle is to allow the vehicle's features, that is to say its functions (whether or not seen by the user), to perform correctly. Put simply, each function requires input data delivered by one or more sensors or computers, and a means for processing these data, and generates output data, controlling one or more actuators or used for one or more computers. It should be noted that the actuators may also send data and the sensors may receive data. The number of functions has increased sharply since the beginnings of the motor vehicle, for safety, comfort or, for example, reliability. In addition, these functions may be of very different natures, whether in terms of calculations required or data handled. For example, one function could simply consist in making a motor react when a sensor is pressed by the driver, but there are also complex driving assistance systems which may use a plurality of high-speed camera streams in order to detect obstacles ahead of the vehicle.

One very important point is also related to the fact that they do not have the same sensitivity with regard to safety and security. Thus, while some functions are not critical for the correct functioning of the vehicle, the failure of other functions may endanger the occupants' lives (triggering of an airbag on the highway, for example). Thus, the management of the time for the acquisition of data, calculations and distribution of commands to the actuators is a very important aspect, as is the security of this information.

Several points related to integration into the vehicle also have to be considered. First, the size and weight of the systems are significant problems. They must be as low as possible in order to keep vehicles at a reasonable size, and with manageable energy consumption. Another point related to the size of the system concerns the interconnection of the sensors, actuators and computing resources: the amount of wiring has to be kept as small as possible for the same reasons. Second, the economic cost of the architecture has to be considered. It has to be sized as accurately as possible so as not to increase the price of the vehicle too significantly. However, this optimization of production cost should not prevent the architecture from being able to meet the performance needs of future functions which will have to be integrated into the vehicle, and the integration of future sensors and actuators (high-resolution cameras, etc.). Indeed, redeveloping an architecture from scratch is also very expensive.

Another very costly aspect in the development of an architecture concerns the late discovery of features to be integrated into a vehicle.

In summary, a technical problem to be addressed is that of being able to provide an electronic architecture capable of evolving and ensuring the execution of current and future functions of a vehicle and therefore to provide sufficient interconnection means and computing power, as well as security, safety and time management properties. These advantageous properties have to be provided with a manageable complexity and bulk.

Current solutions reflect the various periods of automobile development. The prior art is presented hereinafter in order to present the complete architectures according to the main operating types.

In the early years of the motor vehicle, the number of features was much lower and they were largely executed mechanically and manually (like starting the engine for example). At the start of the 1900s, the introduction of electronic engine ignition was the first step on a long journey that led to the addition of electronic systems into the vehicle in order to introduce increasingly complex features, aimed at improving passenger comfort and safety.

The standardization of these systems led to the ECU (electronic control unit) designation introduced at the end of the 1970s. Each ECU is made up of a computing resource (processor or microcontroller), which is generally tailored so as to be as streamlined as possible for cost reasons, with its memories, its inputs/outputs, etc. Thus, since the advent of mass electronic systems in vehicles, the execution of the features of a motor vehicle has depended very heavily on the use of autonomous onboard systems linked to one another and to sensors/actuators via interconnection networks/cables. The present invention falls into the category of vehicle architectures using ECUs, which represents all current vehicles.

In a pragmatic manner, since the 1970s, innovation in this field has been achieved by introducing new architectures, by virtue of the technological progress that has made it possible to provide advantageous vehicle operating properties. In what follows, an overview of the various periods of automotive architectures is presented in order to place the invention within this context.

The first electronic architectures were completely distributed. They consisted in introducing dedicated subsystems for each vehicle function, including their sensors, actuators, computers and interconnection cables.

As the number of functions increased, and they became increasingly dependent on one another (data sharing in particular), it became necessary to implement a suitable electronic architecture in order to keep the complexity under control. However, the networks generated by these architectures (based on dedicated links between resources) had become very complex, with excessive wiring that was no longer tolerable in vehicles (integrational complexity, excessive weight in particular).

In the 1980s/1990s, the arrival of protocols and buses allowing the multiplexing of signals was an important point for the return to an acceptable level of complexity. These technologies allowed the same means of communication to be used by a plurality of ECUs to transmit a plurality of different data and, thus, greatly decreased the number of cables (and the weight in particular). A sensor no longer had to be directly connected to all of the electronic systems using it. It was only connected to one electronic system and this data was communicated over the multiplexed bus to other electronic systems. The ability of ECUs to be programmed and the use of multiplexed buses allows additional functions to be activated at no extra cost, if sizing has been performed appropriately. However, adding new functions usually requires adding an additional ECU to the network.

Multiplexing technologies still make it possible to produce current automotive systems by virtue of technological advancements. Over time, network specialization has emerged, in particular due to the need for sharing or because of specific constraints such as bitrate, time management or reliability requirements. Thus, in a modern car, it is not uncommon to see a plurality of buses from different standards coexisting.

The increase in bitrates for multimedia data has made it necessary to switch to higher bitrates. The use of standard interconnection technologies tried and tested in the computer world, such as Ethernet, has therefore gradually established itself over the past few years. The transmission of multimedia data of various kinds between distributed ECUs has made it necessary to define technologies for synchronization, in particular between images and sounds, in order to stream data.

At the same time, dedicated links, in particular for the transmission of uncompressed video images, have emerged. Links are also available for transmitting video, audio, Ethernet traffic and communication protocols over different channels.

FIG. 1 shows a high-level overview of a current electronic architecture for the management of a motor vehicle. Various ECUs 1 are grouped together on a multiplexed CAN (Controller Area Network) bus 11, 12, 1N, a dedicated ECU 10 (CAN gateway) making it possible to go from one CAN bus to another while observing the time constraints. However, this regular architecture is compromised by the addition of functions that require, for example, higher bitrates than the CAN allows. Thus, for example, the dashed line 2 shows a direct link connecting two ECUs to one another.

Thus, the complexity brought under control by multiplexing becomes a problem once more. There are now more than 70 ECUs in a high-end vehicle, interconnected by an increasingly complex network, made up of heterogeneous subnetworks resulting in a tangle of cables. This generates cost, additional weight and complex maintenance.

Just as the advent of multiplexing made it possible to decrease the complexity of architectures, the adoption of new technologies within the automotive field has allowed the emergence of a new category of architecture, seen as the future generation: architectures based on the presence of domains. One example of architecture based on functional domains is illustrated in FIG. 2. The general idea is to reuse the overview of FIG. 1, but to strongly group the ECUs 1 belonging to the same functional domain together around a dedicated multiplexed bus 21, adapted to the constraints of the domain, the ECUs and the buses being driven for each domain by a domain controller unit 22 (DCU). The introduction of a level of hierarchy per domain, the domain controller, and an application server/gateway 24 to link the domains to the multimedia aspects, connectivity—this is the path currently being explored by manufacturers and equipment manufacturers.

To date, not much emphasis has been placed on architectures based on functional domains. The domain overview is advantageous because the functions (and therefore the ECUs) of one and the same functional domain may be seen as having similar properties, at least in terms of data exchanges, and it is thus possible to optimize the network interconnecting the ECUs of the domain. One of the strengths of this concept is the separation of the ADAS (Advanced driver-assistance systems) domain from the rest, since it is the most demanding domain at present, with the multimedia aspects.

For example, in FIG. 2, it can be seen that the ECUs of the multimedia domain 23 are on a fast Ethernet network at 1 Gbits/s, whereas the other domains require only a CAN FD network at 2 Mbits/s.

However, in practice, weaknesses can already be observed. For example, this distribution does not take into account the location of the ECUs, sensors and actuators in the vehicle. Thus, there is no guarantee that the sensors and actuators of a functional domain are geographically close to the domain's ECU, which involves wiring. Likewise, the domain controller adds an additional ECU. In the context of an optimized architecture, there is no guarantee that the physical architecture will be flexible enough to be adapted to changes in features. Another issue is related to the fact that, in practice, the functions executed on the ECUs of a functional domain are in fact very heterogeneous, in particular in terms of safety level, sensitivity level or types of processing or data. Under these conditions, apart from optimizing the interconnection between the ECUs by decreasing the possible "worst case", it is very complicated both to greatly optimize the computers and to decrease their number by sharing.

In some of the architectures already proposed, one weakness lies in particular in the fact that there is a fixed assignment of logic and software functions to a hardware ECU and optimization of this ECU for its function. Thus, any modification of the architecture will not be easy. For example, adding a domain or adding a new function into a domain requiring the outputs from a sensor or the control of an actuator not belonging to the domain will require complex communications to implement.

A more advanced architecture, called RACE (Robust and Reliable Automotive Computing Environment for Future eCars) is presented in particular in the document by S. Sommer et al "RACE: A Centralized Platform Computer Based Architecture for Automotive Applications", IEEE International Electric Vehicle Conference (IEVC), Santa Clara, CA, 2013. The RACE architecture is based on a centralized computer called a CPC (centralized platform computer) made up of one or more VCCs (vehicle control computers) linked together by an Ethernet network, according to a topology that allows properties of operational safety to be ensured as described in particular in document EP 2 670 087 which discloses a ring topology. One of the principles of RACE is that the vehicle's sensors and actuators have to be smart: they themselves use and manage the data related to local processes. Thus, the CPC is linked to smart sensors/actuators capable of managing themselves via an Ethernet network. The RACE architecture is similar to the architecture based on functional domains except that the domains become more localized in the vehicle and are not grouped together by high-level functions. The RACE architecture remains highly hierarchical at the control level and assumes the presence of these new smart sensors/actuators which manage their domain, including the sensor/actuator control loops. One of the advantages of the RACE architecture is that there is a fairly substantial decoupling between software and hardware in the sense that the assignment of hardware to a particular domain is low. However, there remains a strong coupling between the local control loops operating on the smart sensors/actuators and their location in the vehicle. Thus the architecture is not completely centralized, an important part of control being local. Consequently, a modification to the architecture (at the level of sensors/actuators, software, etc.) requires modifying a number of control loops with complex message/data routes to manage, for example at CPC level. Likewise, adding intelligence to the sensors/actuators involves adding computing resources locally, greatly increasing the cost of the vehicle's electronic architecture.

SUMMARY OF THE INVENTION

An aim of the invention is to overcome the aforementioned drawbacks. To that end, the invention relates to an electronic architecture embedded in a system carrying out the management of the functions of said system, said functions being implemented via a set of sensors and actuators, said architecture comprising at least:
a central computer;
a real-time communication network;
a set of interface modules each assigned to a geographical area of said system, each module:
aggregating signals from at least one of said sensors of the area assigned thereto and sending said signals to said central computer via
said communication network;
and/or distributing control signals to at least one of said actuators of the area assigned thereto;
said central computer driving said actuators according to the signals from said sensors, the control signals for said actuators being sent to said interface modules via said communication network.

At least one of said interface modules aggregates the signals from sensors of a plurality of functional domains and/or distributes commands to actuators of a plurality of functional domains, said sensors and actuators being located in the geographical area assigned to said at least one module.

For example, at least one of said interface modules also aggregates signals from at least one of said actuators and/or distributes signals to at least one of said sensors.

In one particular embodiment, said central computer is composed of a motherboard and of computing subsystems, each subsystem comprising one or more processors which are coupled to a private memory and are capable of executing a plurality of software partitions, said subsystems communicating with one another and with said communication network by means of an interconnection infrastructure implemented on said motherboard.

Said architecture comprises, for example, a centralized functional block for managing data allowing access to the data of the memories present in the computer and in said modules, said functional block providing the various components of said architecture with unified access to the data related to the sensors and actuators distributed in said system and to the data generated by said computing subsystems.

Said functional block is, for example, implemented by means of a distributed memory service virtually shared between said computer and said modules, such that all communications of said central computer with said sensors and actuators pass through said virtual memory and such that the memories distributed in said architecture and all of the sensors and actuators appear to said central computer as a single shared memory.

Said functional block may make it possible to secure the access to the data via the use of attributes associated with the data.

Said architecture comprises, for example, a functional block that provides synchronization between said computing subsystems.

Said architecture comprises, for example, a functional block that provides and supports the services linked to the operational dependability of said system.

In one particular embodiment, said interface module comprises at least:
a communication processor;
communication interfaces between said processor and actuators and/or sensors;
a communication interface between said processor and said communication network;
said communication processor having the function of arranging the data from said sensors into packets in order to transmit them to said central computer via said communication network and to distribute the command data from said central computer, via said communication network, to said actuators.

Said communication interfaces between said processor and said actuators and/or sensors being of different types, said processor translates, for example, communication protocols of said interfaces in order to exchange said data with said central computer according to a single protocol.

Said architecture comprises, for example, at least one gateway able to connect said communication network to at least one other communication network.

It comprises, for example, a secondary computer communicating with said communication network by means of said gateway (35), said secondary computer driving functions which are connected to said other network.

It comprises, for example, a combination of techniques in addition to the execution of a plurality of software partitions, said combination forming virtual domains, each virtual domain covering at least one of said partitions processing the interface modules (33) of a group of sensors and actuators. Said combination comprises, for example, a combination of data transfer segregation mechanisms in said realtime communication network. Said combination is, for example, based on data attributes placed by said interface modules.

The communications between said central computer and said interface modules are, for example, controlled by said computer.

Said architecture comprises, for example, a subsystem for managing the input and output signals with high transmission speeds, which is connected to the interconnection infrastructure of said motherboard, said subsystem being composed of one or more daughterboards and performing the function of an interface module between sensors and/or actuators with high transmission speeds and said central computer.

Said communication network is of deterministic Ethernet type; for example, it is of TSN Ethernet type.

BRIEF DESCRIPTION OF THE DRAWINGS

Other features and advantages of the invention will become apparent from the following description, which is given with reference to the appended drawings, in which.

DETAILED DESCRIPTION

The following description of the invention is given by way of example for an onboard system in a vehicle. It nevertheless applies to other onboard systems, mobile or otherwise.

Figure 3A:
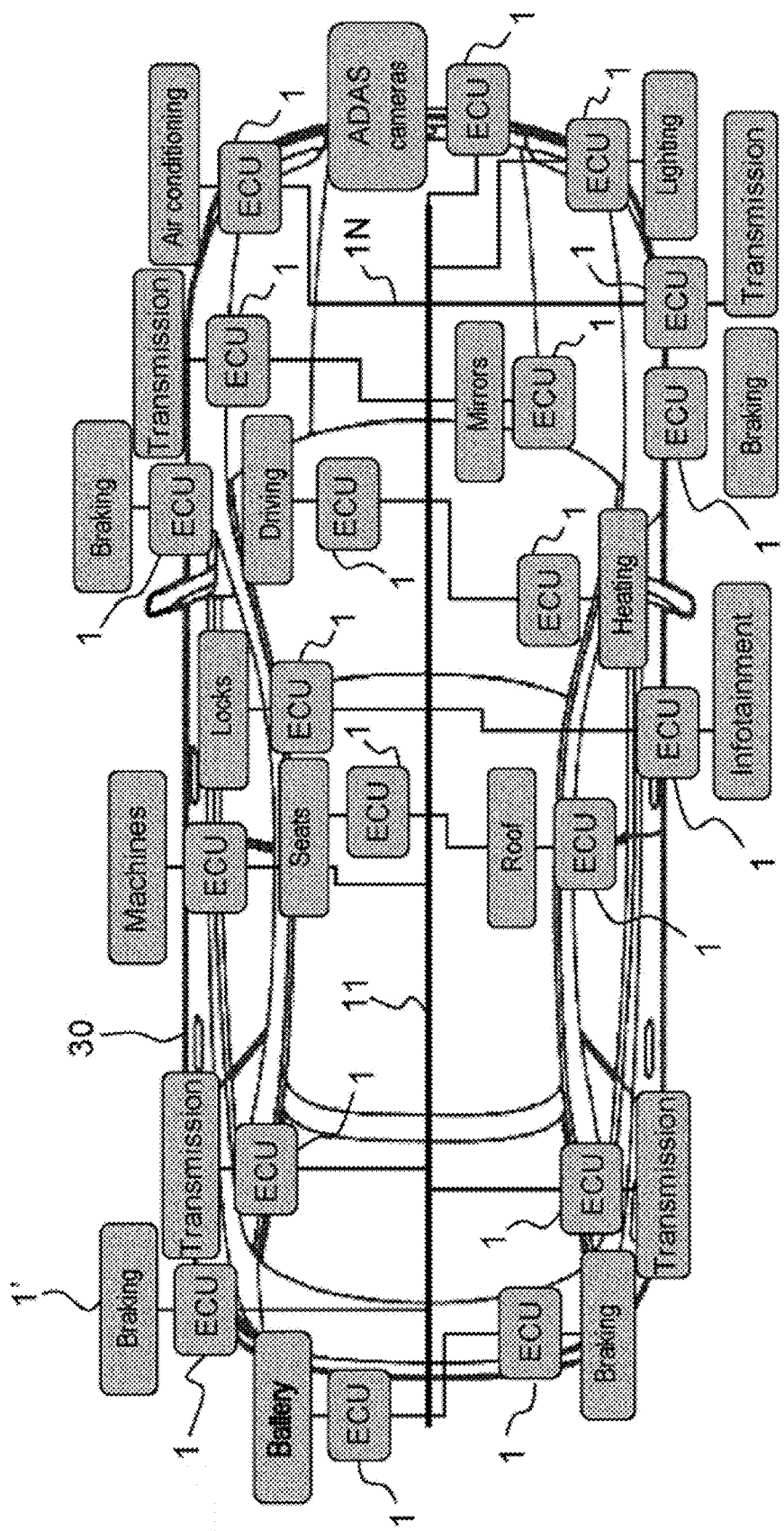
FIGS. 3a and 3b respectively show an architecture according to the prior art and an architecture according to the invention.
Figure 3B:
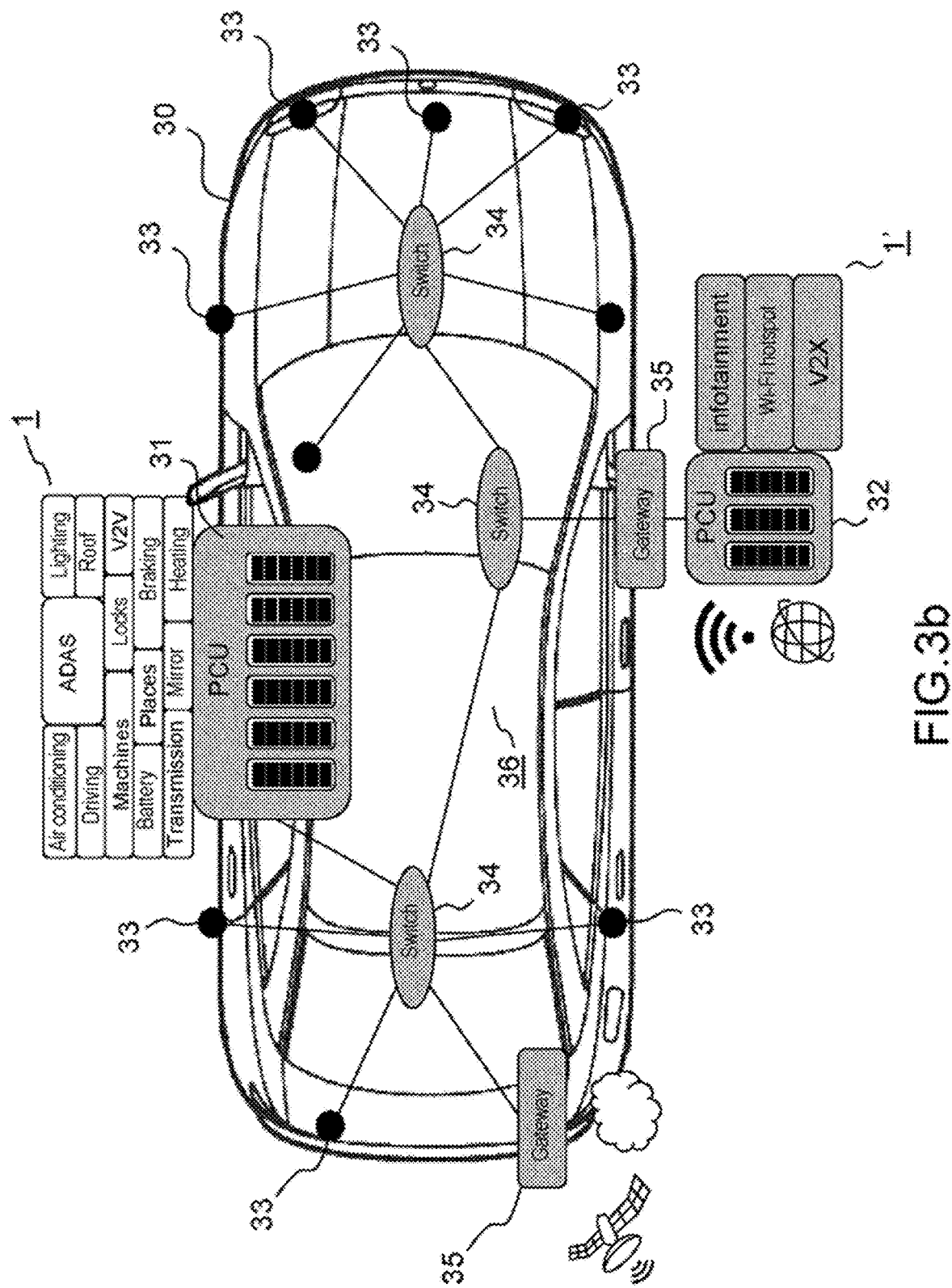

FIG. 3b illustrates the principle of an electronic architecture for a motor vehicle according to the invention, with reference to FIG. 3a which illustrates an architecture according to the prior art.

Figure 1:
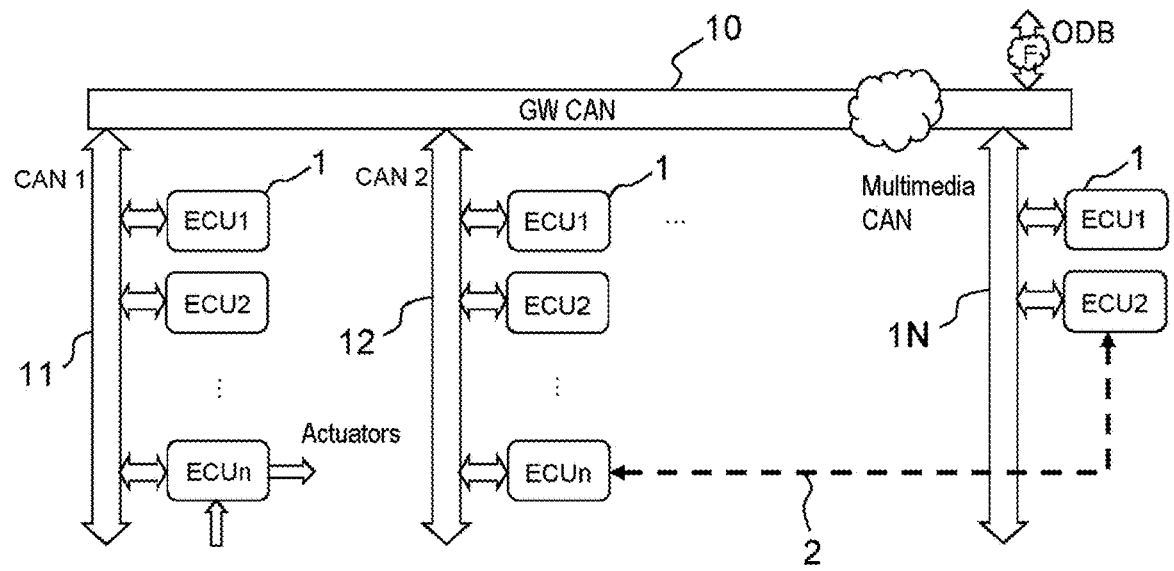
FIG. 1, already described, shows a high-level overview of a possible electronic architecture for a current motor vehicle.
Figure 2:
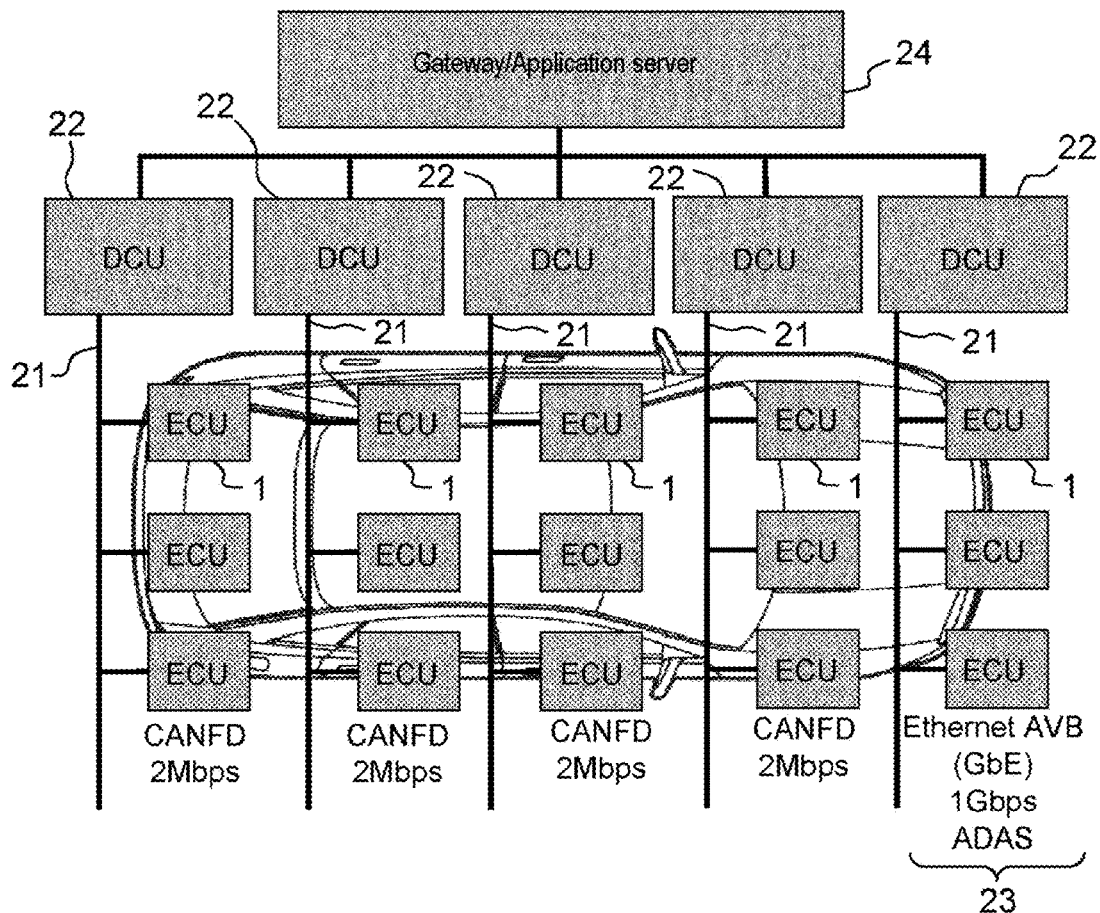
FIG. 2, already described, shows one example of architecture based on domains.

More particularly, FIG. 3a copies the architecture according to the prior art of FIG. 2 but illustrates the processing and functions driven by the ECUs, giving an indication of the geographical location thereof in the vehicle 30. A single multiplexed bus 11 is shown, around which are grouped all of the ECUs 1 shown. The functions driven by the ECUs are given in boxes denoted by 1'.

To illustrate the principle of the invention, FIG. 3b presents an exemplary architecture which essentially repeats the functions of FIG. 3a. The invention proposes a shared and centralized computing architecture for the management of the functions of a vehicle. In particular, the ECUs and the multiplexed buses of FIG. 3a are replaced with a central physical computer 31 and with a real-time network connecting interface modules 33 aggregating signals from sensors and distributing control signals. It is possible to provide one or more secondary computers for functions which do not come under the main computer, in particular for non-critical functions.

The architecture of FIG. 3b comprises, by way of example, a secondary computer 32. The central computer 31 is assigned to the management of the vehicle itself. The secondary computer 32 is assigned to the management of connectivity and multimedia. These two functional domains have different criticalities and vulnerabilities and may therefore be dissociated for greater dependability and safety. For example, the first computer 31, responsible for vehicle safety functions, requires redundancy while the second computer 32, responsible for multimedia, does not need it. Savings are advantageously made by having redundancy only for the central computer. For safety, the second computer handles functions open to the outside, such as the multimedia domain for example, thus protecting the main computer from any risk of intrusion, in particular by using advanced protection techniques between the two computers.

The functions 1' driving the actuators and processing the data from the sensors, executed by the ECUs in FIG. 3a, are executed by the central computer 31 and by the secondary computer 32. These computers 31, 32 may subsequently be called PCUs for "physical computing units".

The communication network 36 connecting the various modules 33 and the PCUs is for example of TSN ("Time-Sensitive Networking") Ethernet type, but other types of real-time communication network are possible, deterministic or otherwise. At this stage, it may be specified that, according to the invention, the modules 33 aggregate all of the signals from the sensors and actuators which were connected directly to the ECUs in the prior art. They share a higher-speed physical link (Ethernet) in order to reduce wiring. This sharing is possible because the communication bitrate and the latency of this physical link are sufficient for transferring the data from the sensors/actuators connected to the aggregation modules 33 to the central computer in a time compatible with the control of the vehicle's functions.

It is possible to provide one or more switches 34 within the network, each switch addressing one or more aggregation modules/PCUs. The exemplary architecture of FIG. 3b comprises three switches.

In this example, it is possible to see the advantages of the geographical distribution of the aggregation modules 33; specifically, the link between the front and the rear of the vehicle is here provided by a shared physical link, via the real-time network, instead of a plurality of cables as in the prior art. For safety reasons, specific techniques such as duplication or redundancy, for example, may be applied to the interconnection 36 in the vehicle.

For their part, the two, shared, computers 31, 32 are responsible for performing vehicle management, this management being devolved to the distributed ECUs in the solutions of the prior art as illustrated, in particular, by FIG. 3a.

The architecture may comprise gateways 35 supplementing the interconnection network 36, in order to connect the local network to other networks, the Internet for example, in complete security. These other networks may also be networks internal to the system.

Figure 4:
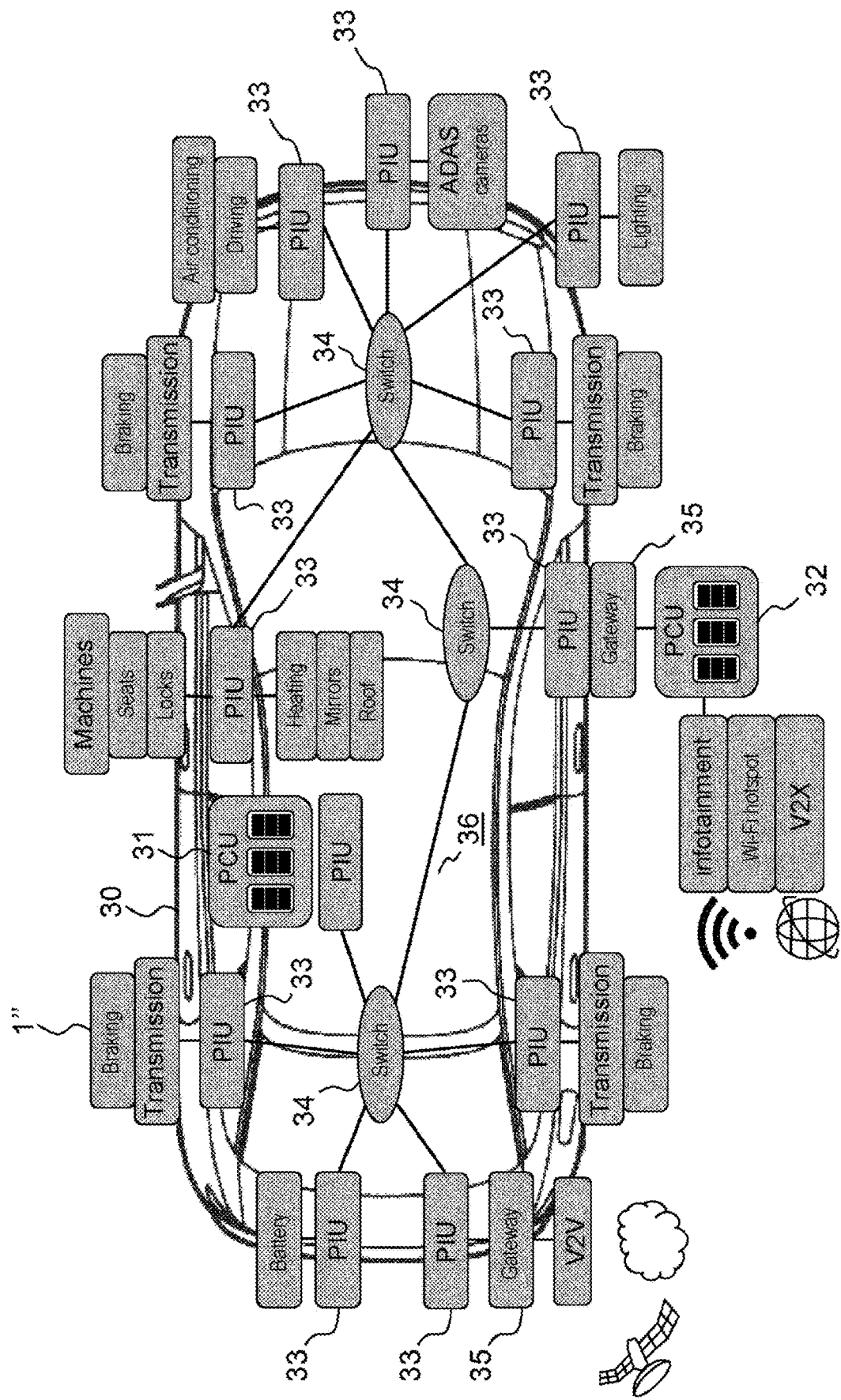
FIG. 4 shows an architecture according to the invention in more detail, addressing various possible functions of a motor vehicle.

FIG. 4 shows the architecture of FIG. 3b in greater detail. In particular, functions dependent on the signals from the sensors/actuators connected to these modules are specified, by way of example, for each module 33. It also specifies the modules 33 for aggregating signals and distributing commands, each with the sensors or actuators 1" that they drive. The various functions of the vehicle (propulsion, braking, lighting, air conditioning, infotainment, etc.) are implemented via all of these sensors and actuators. More precisely, the sensors and actuators participate in the execution of the functions, the computing being performed in the PCU 31, and possibly in one or more secondary computers 32.

These modules 33 may subsequently be called PIUs ("physical interface units"). All of these PIUs are interconnected by virtue of the real-time network making it possible, in particular, to keep the latencies in transmitting the synchronization signals of the whole of the system under control, and above all making it possible to keep the latencies in transmitting the packets containing the data from the sensors and the data/commands for the actuators under control. In accordance with the above description, the network may be made up of switches 34 and of portals or gateways allowing the data packets of the network to be routed and the connection between the architecture of the system and the outside world (multimedia connectivity, for example) to be secured. To that end, in the example of FIG. 3b and of FIG. 4, the PCU assigned to the multimedia domain accesses the network via a gateway 35, the latter being interfaced to the network via a PIU.

This architecture may therefore execute high-criticality functions, such as, for example, driving the powertrain, monitoring the battery or the ADAS security system in particular. At the same time, it may execute the driving of low-criticality functions such as the air conditioning, for example, as well as other types of services. All of these functions may be executed by one and the same PCU 31 by virtue of technologies for sharing computing resources such as hypervisors, for example.

Figure 5:
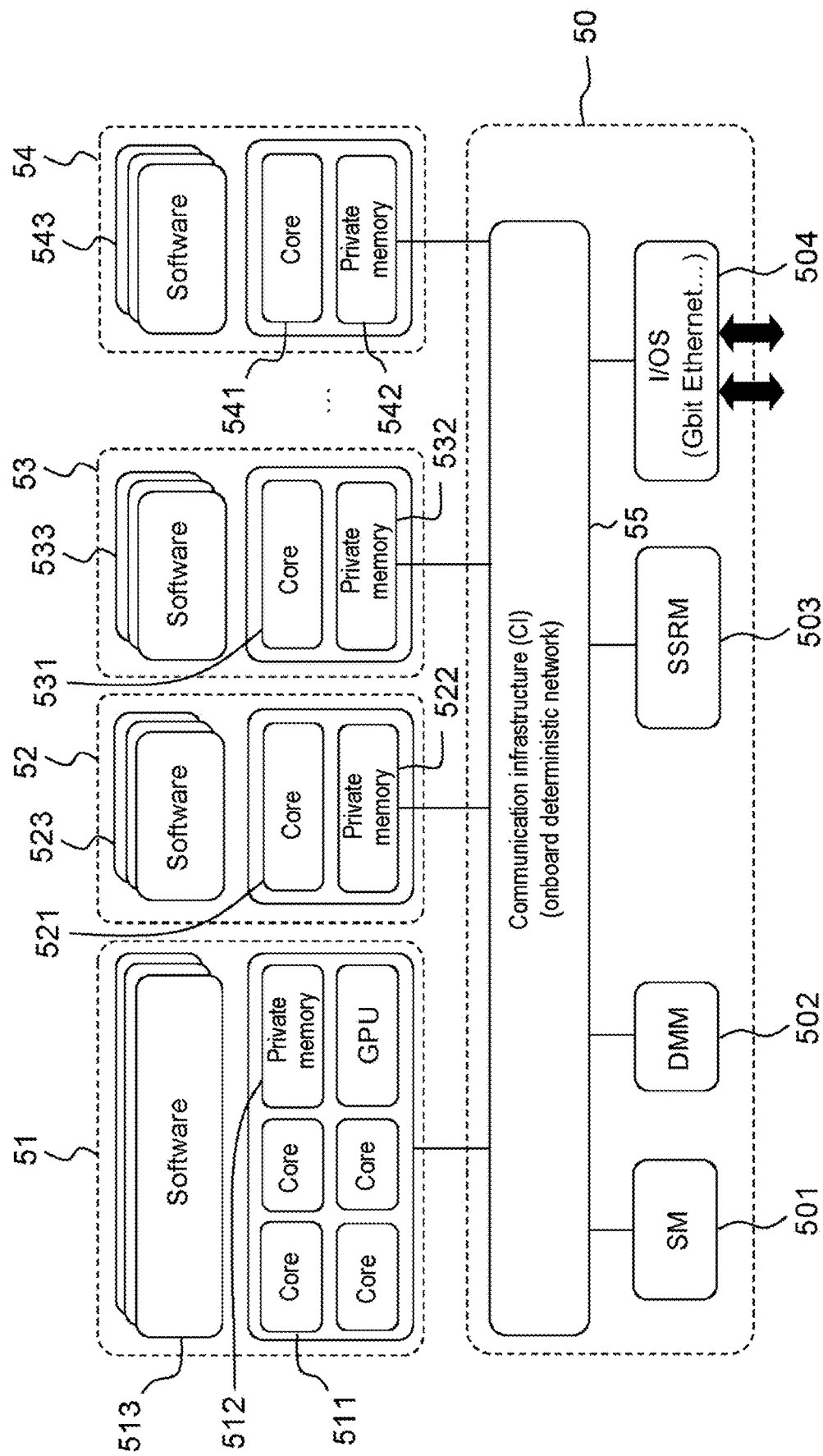
FIG. 5 shows one exemplary embodiment of a central computer used in an architecture according to the invention.

FIG. 5 illustrates the makeup of a computer 31, 32. A PCU is a modular system, with low power consumption, composed of a motherboard 50 and of one or more computing subsystems 51, 52, 53, 54. The subsystems may be completely heterogeneous with respect to one another, that is to say they may comprise processors 511, 521, 531, 541 of different types and/or of different specificities. These subsystems may be integrated into the motherboard or available (integrated) as daughterboards as illustrated in the example of FIG. 5. In this example, four daughterboards 51, 52, 53, 54 are connected to the motherboard 50.

The subsystems communicate with the motherboard and the rest of the system by virtue of a deterministic communication infrastructure 55 integrated into the motherboard.

In the particular example of FIG. 5, the computing resources of the subsystems are composed for each of one or more processors 511, 521, 531, 541 coupled to a private memory 512, 522, 532, 542 which are capable of executing one or more software partitions 513, 523, 533, 543. For example, these software partitions may be applications, processes (the segregation of which is achieved using software mechanisms of operating systems), or even entire operating systems, separated using hypervisor mechanisms.

The PCU also comprises functional blocks which make it possible to support the execution of ancillary functions for ensuring or improving the properties of the architecture. Services, of application-segregation or data-protection type, are used to support the execution of the software partitions on each computing resource; for example, a hypervisor may be used.

A "data management module" (DMM) functional block 502 makes it possible to provide the various components of the vehicle with unified access to the data related to the sensors and actuators distributed in the vehicle as well as to the data generated by the subsystems. This functional block 502 may, for example, be produced via a virtually shared distributed memory service (a DSM—distributed shared memory) used to simplify communications between the subsystems and to store and manage all of the vehicle's data in order to facilitate access thereto. This service may be performed via a service from a hypervisor or an operating system for example. This distributed service may be supported by a hardware component for managing the data allowing deterministic access to the sensors and actuators via the PIUs and to the data generated by the computing subsystems 51, 52, 53, 54. By combining a unified overview of vehicle data with mechanisms for managing data access times, the DMM functional block 502 has the advantage, in particular, of providing a temporal guarantee for accessing data distributed in the vehicle.

The substantial sharing allowed by the architecture according to the invention may advantageously be based, in particular, on this functional block 502. It provides a unified overview of the various memories belonging to distributed resources at the sensor and actuator level. In order to maintain the advantageous properties required for an automotive system (time management, low latency, etc.), the functional block 502 employs, for example, a hardware accelerator to maintain consistency of the data within the system, for example by autonomously preloading sensor data at regular intervals. All communications with the sensors and actuators, via the PIUs, go through the virtual memory, which makes it possible to present the memories distributed in the system (memories of sensors, actuators, PIUs, PCUs, etc.) as a single shared-memory machine. A unified overview of the memories is obtained, which is accessible to all of the computers. One advantage of this solution is that if attributes are added to the data, an efficient and centralized access control system makes it possible to tightly secure vehicle data and to reinforce the concept of overall virtual domains presented below.

A "synchronization manager" (SM) functional block 501 makes it possible to ensure synchronization between the computing subsystems, which are possibly distributed in the vehicle. This functional block 501 may, for example, be implemented by a hardware accelerator called the HSM (hardware synchronization manager). The DMM and SM functional blocks may be coupled (or even implemented in the same functional block, for example) in order to achieve, for example, data-related synchronizations. A functional block 503 called the "safety and reliability support module" (SSRM) makes it possible to ensure and support the services related to the safe operation of the system and its reliability, for example by managing the redundancies in the system. This functional block may, for example, be implemented by distributed software services, possibly supported by hardware accelerators or interfaces specialized for duplication.

In the exemplary embodiment of FIG. 5, the various functions described above are provided by functional blocks specific to each function, each block communicating with the rest of the system via the communication infrastructure 55. It is possible to group some of these functions together in one and the same functional block.

This motherboard-daughterboard architecture is advantageously flexible and composable. It constitutes a generic system that can target different ranges of vehicles while providing for current and future functions, such as autonomous driving applications or complex infotainment applications, for example. One important point lies in the possibility of reusing the various components of the system in the largest number of vehicles in order to decrease production costs.

The use of daughterboards makes it possible to use resources that are adequate with respect to the properties of the functions to be performed; for example, functions using screens or image processing may be grouped together on boards with an SoC equipped with a GPU (graphics processing unit) while highly critical functions may be sent to a daughterboard with better time management. Thus, the architecture advantageously makes it possible to optimize the computing system by grouping together the functions that have the same properties on a computing subsystem that is optimized for providing these properties (types of computing, security/safety, time criticality, etc.).

Thus, during design (or during the service life of the vehicle in the event of a hardware update), the very architecture of the system may be optimized by dividing and/or separating functions, and the grouping together thereof according to their properties over adapted and possibly highly heterogeneous hardware resources (subsystems) (with the inclusion of dedicated accelerators, for example). This physical grouping together of functions/parts of functions within subsystems, which functions are segregated from one another by software partitions, makes it possible to tailor all of the subsystems to be as streamlined as possible, the architecture being flexible enough to be adapted a posteriori, for example by way of daughterboards.

Furthermore, the use of daughterboards connected to a motherboard allows the use of high-bandwidth and low-latency interfaces, according to what is needed, for the acquisition of raw images for example.

The motherboard performs a network backbone function allowing the daughterboards to be interconnected with one another and with the rest of the system, this interface with the rest of the system being formed by duplicate links (or in any case redundant links, which are not necessarily homogeneous), for example gigabit Ethernet links 504. This motherboard also contains functions that observe the integrity of the system. Specific functions may be added, such as, for example, arbitration for access, protection or management of complexity, heterogeneity or non-functional parameters such as temperature, aging of components or energy consumption.

Figure 6:
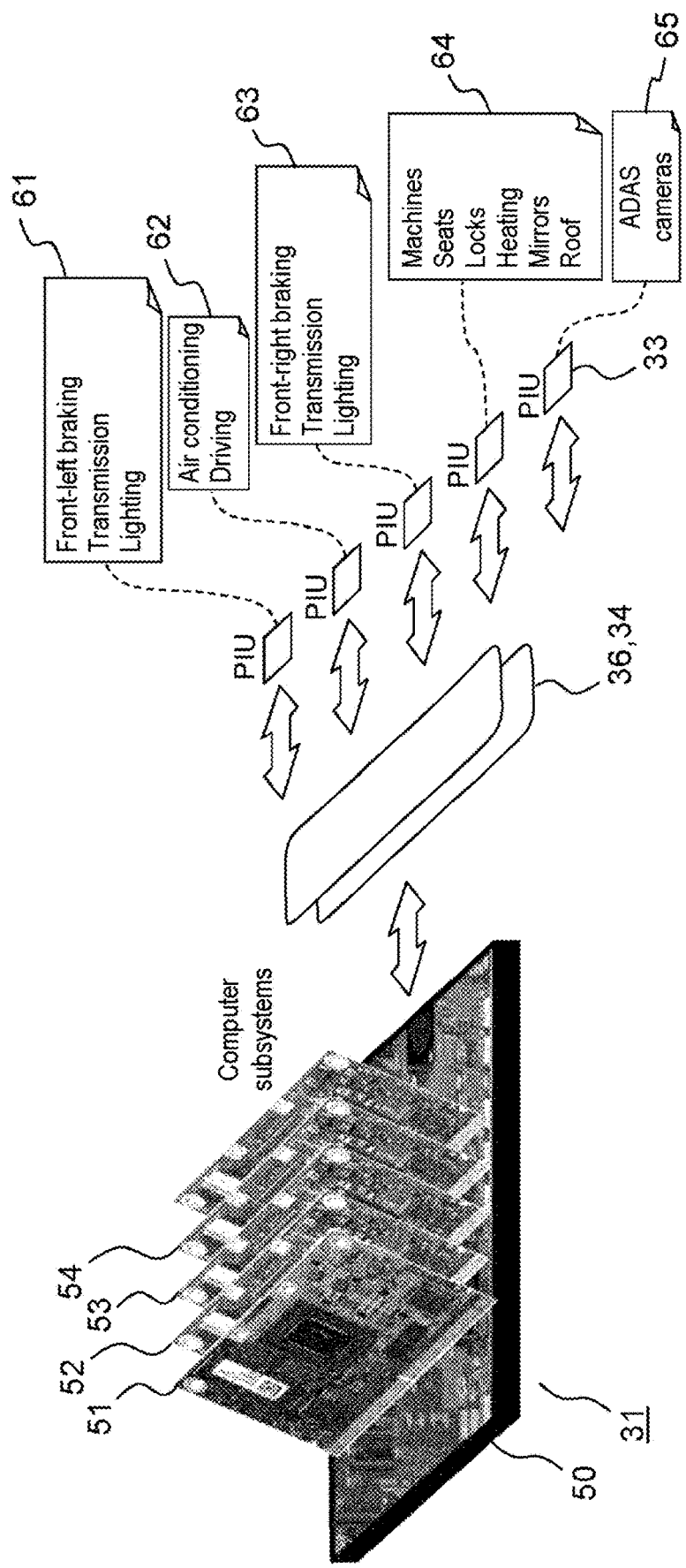
FIG. 6 shows an architecture according to the invention with an interface module which aggregates each of the heterogeneous sensors/actuators in order to connect them to the central computer.

FIG. 6 illustrates a representation of an architecture according to the invention with a PCU 31, made up of a motherboard 50 and daughterboards 51, 52, 53, 54 communicating with PIUs 33, which are distributed geographically in the system to be controlled, via a network 36 implemented by a network of Ethernet type. The PIUs aggregate the signals from the sensors of the various geographical domains 61, 62, 63, 64, 65 and send commands to these same domains. These domains may, for example, correspond to the front left, front right, rear left, rear right or the passenger compartment of the vehicle. More precisely, in the case of FIG. 6, each PIU is assigned to a plurality of functional domains (braking, powertrain, driving assistance, etc.) by addressing a plurality of sensors and/or actuators linked to its geographical domain. In other words, the PIUs are not primarily assigned by functional domain, but by geographical domain. For some systems, there may be special implementational cases where the assignment per geographical domain corresponds to the assignment per functional domain.

As indicated above, the PIUs only have the function of aggregating the data from the sensors and of redistributing the commands; they do not perform high-level processing in the sense that these processing operations do not involve autonomous decision-making, controls and decision-making always being performed at the level of the central computer 31 or possibly of the one or more secondary computers 32.

Figure 7:
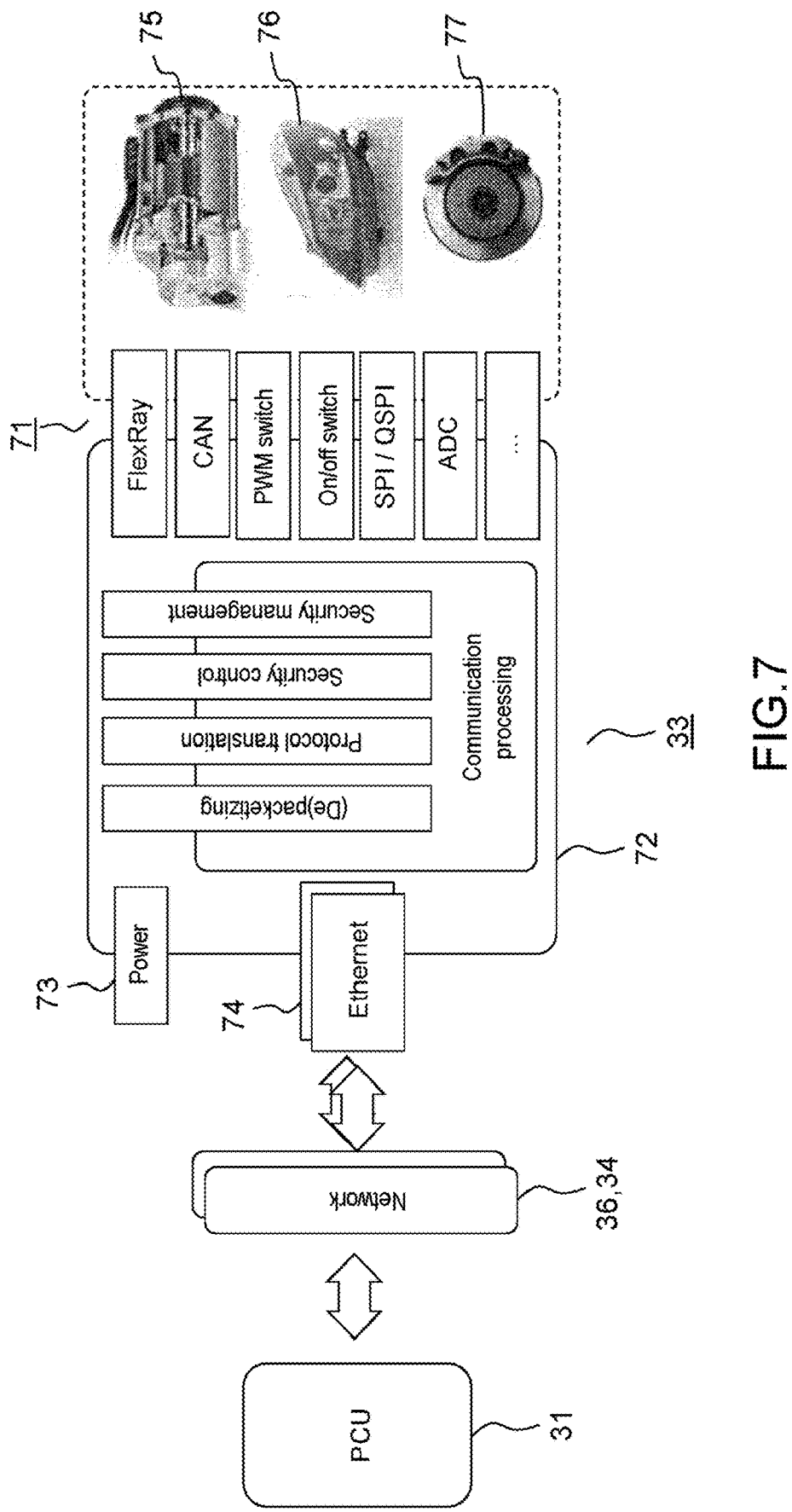
FIG. 7 shows one exemplary embodiment of an interface module used in an architecture according to the invention which aggregates the signals exchanged with the sensors and actuators distributed in a vehicle.

FIG. 7 illustrates one exemplary embodiment of a PIU. The PIU is a network component that makes it possible to connect the sensors and actuators to the rest of the electronic architecture but also to the gateways 35 and other elements of the network. In the example of FIG. 7, the PIU shown addresses three functional domains by the sensors and actuators to which it is connected: drive 75, lighting 76 and braking 77. This PIU may, for example, be placed at the front left of a vehicle and thus be connected to the sensors and actuators placed in an area at the front left.

The architecture of the PIU of FIG. 7 is generic; in particular, it does not depend on the functional domains addressed, and only the sizing (computing system, memory) or the interfaces may be dependent. This makes it possible, in particular, to decrease the difficulty in integration as well as production costs. More particularly, FIG. 7 presents the general structure of a PIU. The function of the PIU is, in particular, to packetize the signals from the sensors in order to transmit them to the PCU (or to a plurality of PCUs) and to distribute the commands to the actuators by processing packets from the PCU.

Thus, the PIU is responsible for presenting the network 36, and in particular the PCU, with a unified overview of the signals to the actuators (and possibly to the sensors) and from the sensors (and possibly from the actuators) which may in practice be highly heterogeneous, in particular by translating communication protocols. The interfaces 71 with the sensors and actuators managed by the PIU may therefore be of different types, for example FlexRay, CAN, PWM switch, SPI, QSPI or ADC. The unified overview of the sensors and actuators by the PCU translates in practice into a single protocol for communicating data from or to a PIU (seen from the PCU side), regardless of the interface for communication with a sensor and/or an actuator.

The PIU is thus able to communicate with these different standards in order to format the data received from the sensors/actuators as real-time Ethernet packets transmitted over the network 36 and, conversely, to send commands in the different standards, which commands come from the PCU in the form of Ethernet packets. A protocol other than Ethernet may of course be used.

The real-time interconnection network 36 has a greater bandwidth than the interfaces between the PIUs and the sensors/actuators. This therefore makes it possible to decrease the number of cables in the vehicle by sharing this interconnection link. Advantageously, the PIU takes heterogeneous signals from the sensors while ensuring the temporal compatibility of them being sent with the operation of the vehicle (via a pre-established and modifiable configuration for example) and fills each transmitted packet as much as possible in order, in particular, to maximize bandwidth and minimize latency, by grouping digital data of different signals together in a single packet. Conversely, the packets from the computers aggregate a maximum of digitized command data intended for the actuators addressed by the PIU, the PIU being responsible for redistributing these commands while ensuring the temporal compatibility of them being transmitted with the operation of the vehicle (via a pre-established and modifiable configuration for example), thus providing time management.

By way of example, three components of a vehicle are shown in FIG. 7, an electric motor 75, a headlight 76 and a braking system 77. One or more actuators and sensors, not shown, are associated with each of these components. They are controlled by actuators, which are themselves controlled by the command data from the PCU transmitted via the communication network 36, the communication processor 72 and the communication interfaces 71. Likewise, sensors (cameras, speed sensors, temperature sensors, etc.) transmit data to the PCU via the reverse route.

To take into account the constraints of the functional domains, the PIU is also responsible for various services such as safety, security (data encryption/decryption for example), controlling the integrity of messages and/or managing the redundancy of messages. Packet processing, protocol translations, and security and control functions are performed by a communication processor 72. An electrical power supply block 73 is also provided. It may be integrated into the PIU or otherwise. Advantageously, the overall electrical power supply for the system may thus be distributed akin to the geographical distribution of the PIUs and of the one or more PCUs. The complete architecture is advantageous from this point of view. Specifically, the electric shaft may have its own topology (or follow the interconnections of the communication network), but control is advantageously transmitted by the computer control network of the system.

Electrical consumption may advantageously be optimized. Specifically, a PIU may be supplied with power only when necessary; the command to switch on the electrical power supply block 73 and the power supplies for the sensors/actuators that are connected to the PIUs may be transmitted by a control signal passing through the network 34, 36, 74. To that end, an appropriate interface is integrated into the power supply block; a transistor of smart MOS type or a smart switch for example. By virtue of the overview of the architecture by the PCU and the possibility of transmitting fine-grained control signals over the interconnection network, very fine management of the power supplies is possible.

One important aspect of the architecture lies in its ability to share the interconnection network 36. Given the speeds and latencies involved, this requires substantial bandwidth and periodic or aperiodic message sending capability. The use of an Ethernet link 74, for example, to perform the communications allows the necessary bandwidth to be obtained. This link also provides flexibility and allows the use of different communication standards. The time management, ensuring that information propagation times are controlled, may be based on standards supporting the conveying of information of different criticalities.

One notable advantage of the electronic system according to the invention is its ability to advantageously support a network allowing the segregation of communications, for example via the use of virtual links (VLAN type, etc.) and therefore virtual private networks in order to produce virtual domains on demand and, for example, to separate the critical domains from the non-critical domains, without however physically allocating part of the architecture to a particular domain, as in the case of architectures based on functional domains.

Figure 8:
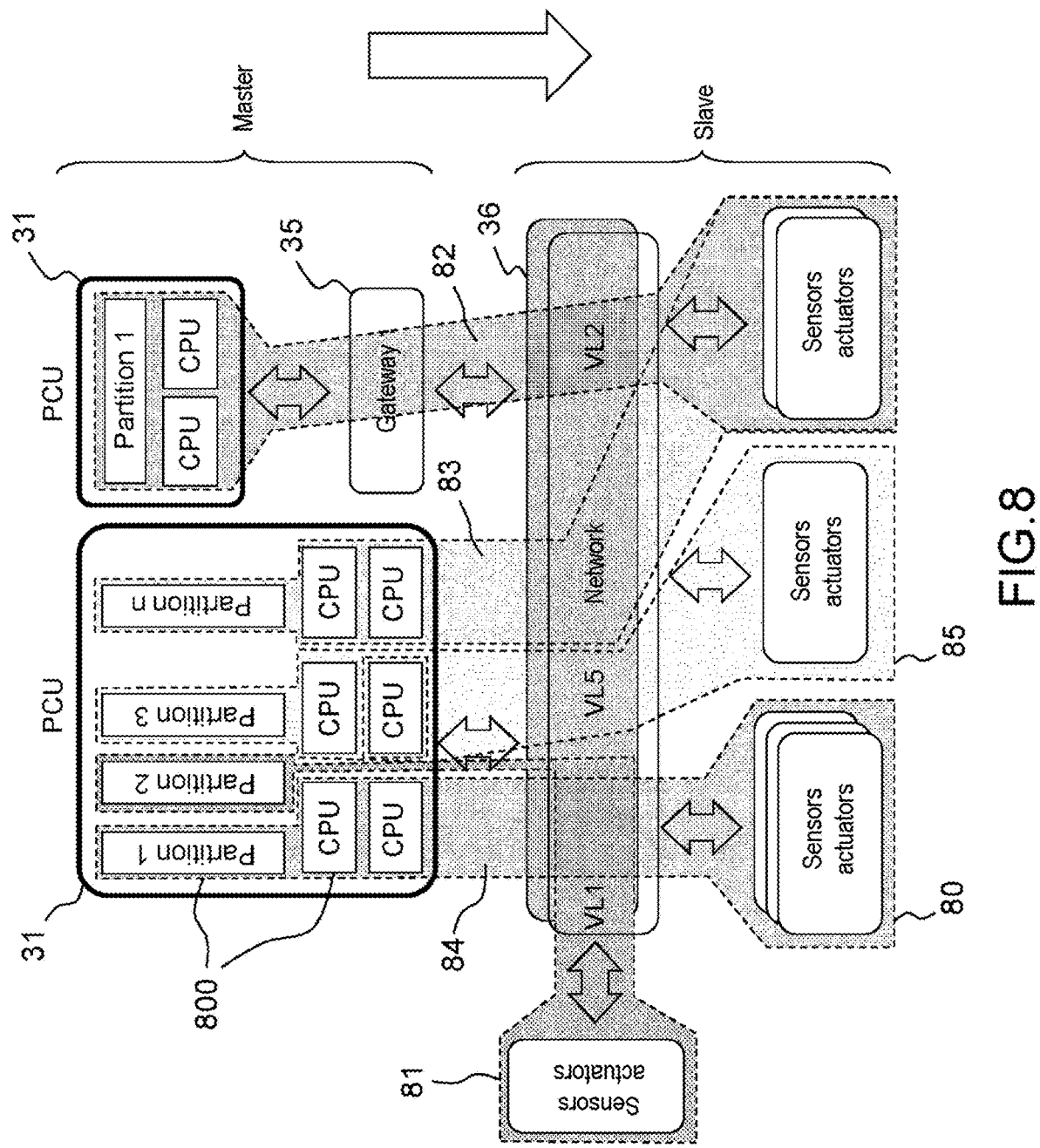
FIG. 8 illustrates virtual domains implemented by virtue of the use of virtual links in an architecture according to the invention.

FIG. 8 shows how the use of virtual domains makes it possible to logically group together physically distributed sensors and actuators and to separate them into various independent virtual regions. More specifically, FIG. 8 illustrates virtual domains 81, 82, 83, 84, 85 implemented by virtue of the use of virtual links between various components and parts/subassemblies of the system. These virtual domains are, for example, a combination of segregation technologies of which a virtual local area network or VLAN is part. For example, a virtual domain 84 covers a plurality of processors (CPU) and a processing partition of the PCU 31 (forming a virtual machine), and the aggregation and command interfaces for a group of sensors and actuators 80 which may be distributed in the vehicle. This may be the virtual domain which makes it possible to manage the engine/motor domain with its sensors and actuators distributed in the vehicle, and the corresponding virtual machine 800.

More generally, according to the invention, virtual domains may be produced using a combination of techniques, in particular by means of data attributes placed by the PIUs 33, of virtual links over the interconnection network 36, of the management of the attributes in the DMM 502, or of hardware and software segregation techniques (one processor per domain, for example) with, in this case, one processor for a plurality of domains, the segregation being performed by memory protection obtained using the basic functions of an operating system or using a hypervisor, which makes it possible to separate two operating systems running on the same hardware resource. Regarding the technique using PIU data attributes, this consists, in particular, in separating groups of data from different sensors or actuators on a PIU by assigning a different attribute to each group.

In this architecture, it is not the actuators or the sensors which initialize communications; it is the PCU 31, 32. This exemplary configuration is thus of master/slave type, where the master is the PCU. The PCU requesting data from the PIUs is one exemplary implementation; it is of course possible to provide an implementation where the PIUs send data to the PCU without initialization of communications by the latter, without a master/slave context.

In this network, the switches allowing the components to be interconnected with one another are designed to support the advantageous properties of the system such as bandwidth, low latency, security and safety. The gateway block 35 provides security by isolating the architecture from external communications handled by a second PCU 32.

Figure 9:
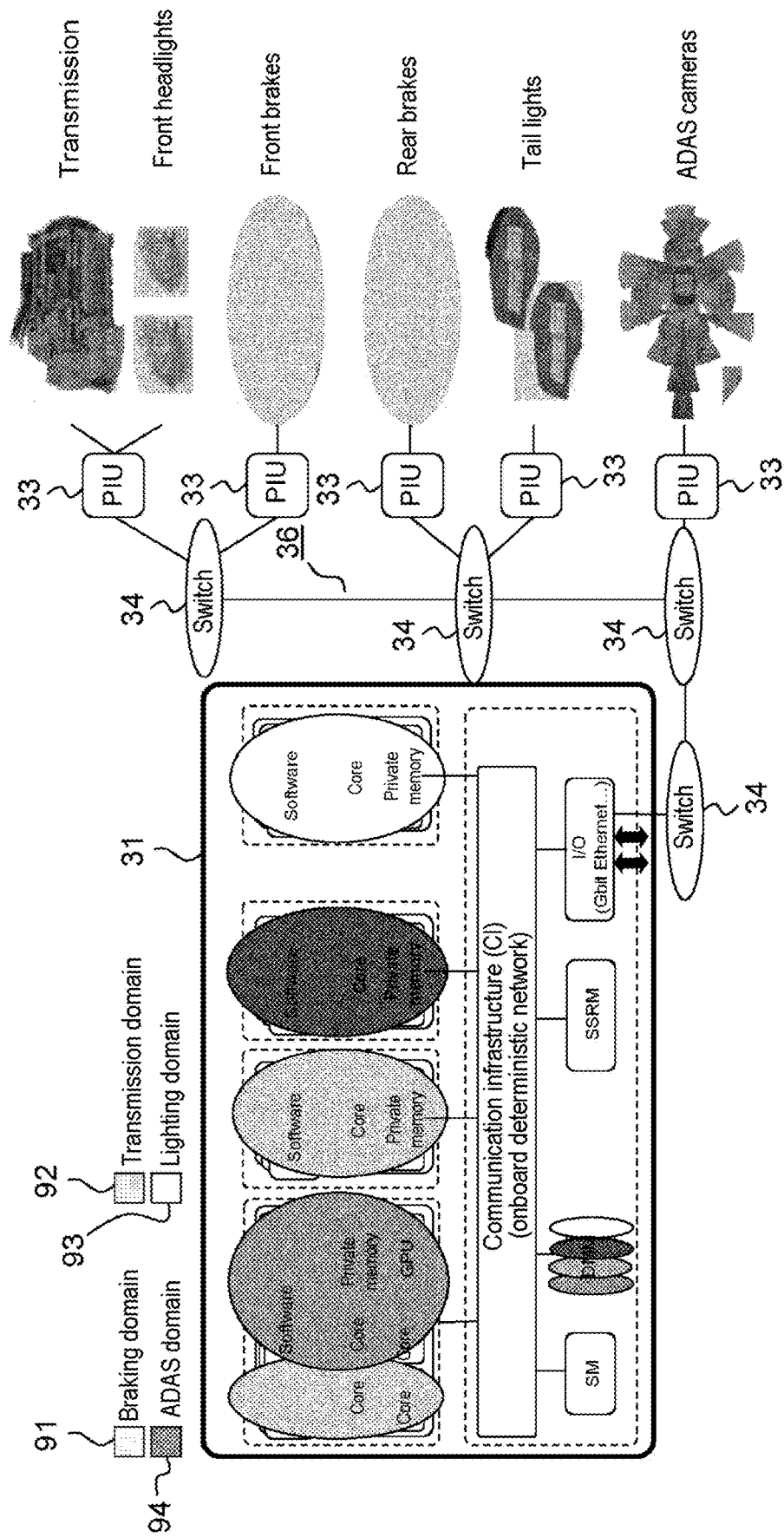
FIG. 9 illustrates the virtual domains in an architecture according to the invention with the various contributors.

FIG. 9 illustrates the virtual domains described above in an architecture according to the invention, reflecting the various hardware and software contributors. The invention advantageously creates virtual domains to separate the constraints related to the physical onboarding of the components of the system from the constraints of using the data and of allocating the functions of the vehicle with respect to the computing cores. These virtual domains may be efficiently created by using the properties of the architecture: logical/virtual domains may, for example, be created (even dynamically) by using the association between the virtual links provided by the interconnection 34, 36, the DMM data management functional block 502, the security attributes on the data managed by this DMM functional block 502 and the use of software and/or hardware segregation services between the applications/functions such as hypervision or operating systems technologies. These domains may also be supported by technologies for the authentication of sensors/actuators or subsystems, for example implemented via authentication services.

The example in FIG. 9 illustrates four virtual domains created on the architecture by using the combination of its segregation technologies:
 a virtual domain for the braking domain 91;
 a virtual domain for the propulsion domain 92;
 a virtual domain for the headlight (lighting) domain 93;
 and a virtual domain for the camera domain 94 for the driver-assistance systems (ADAS).

The computers of the PCU 31 communicate with the PIUs 33 distributed in the vehicle, via the communication network. Switches 34 supporting virtual links (e.g. VLAN) are distributed in order to direct communications to the Ms. FIG. 9 clearly illustrates the physical part/logical part dichotomy. The tail lights and headlights, which are physically remote from one another, are in the same virtual domain (and are potentially synchronized) although they are linked to different PIUs. The same applies for the front and rear brakes.

Figure 10:
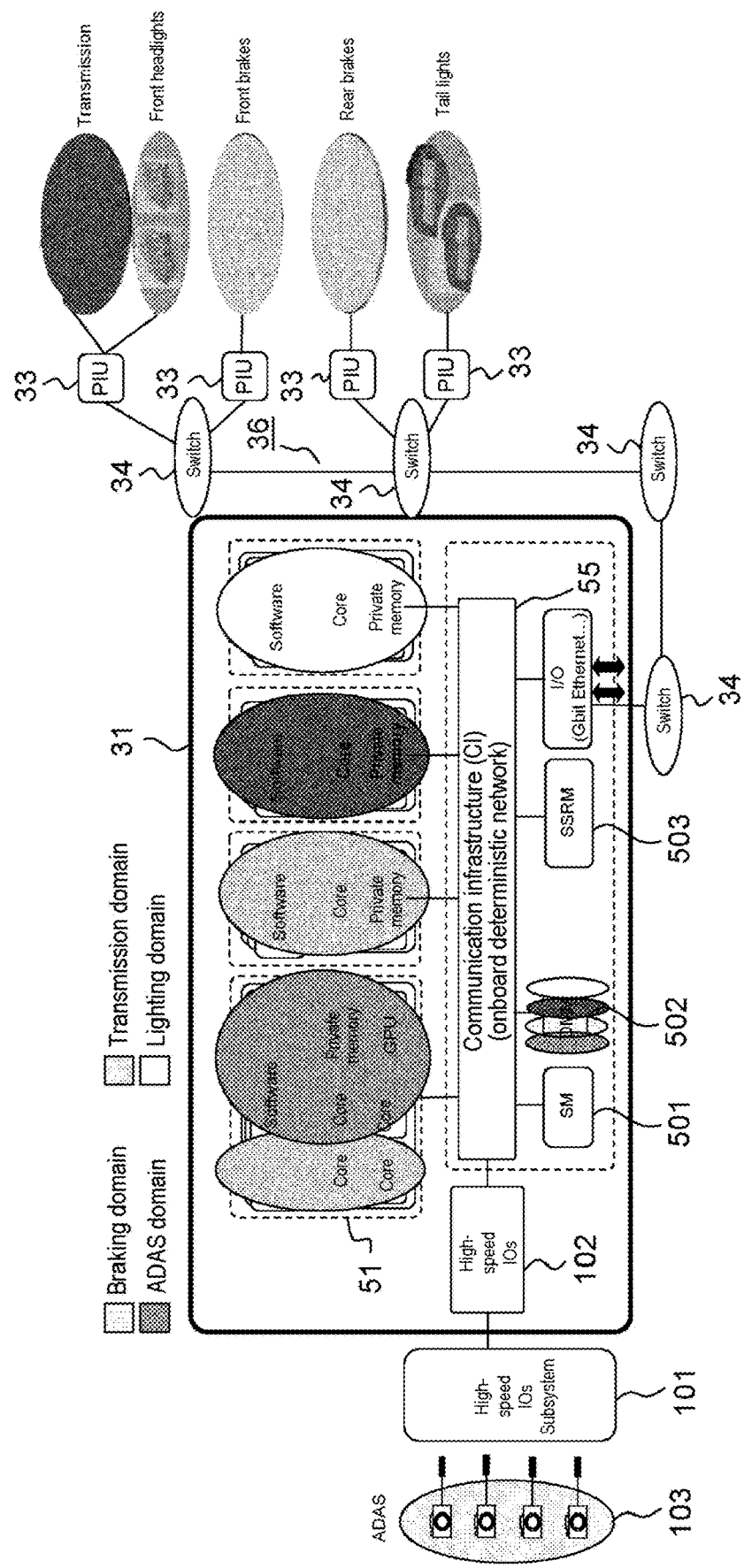
FIG. 10 shows FIG. 9 including a subsystem for managing the high-speed inputs and outputs.

FIG. 10 illustrates an alternative embodiment of an architecture according to the invention. In the example of FIG. 10, the system described in FIG. 9 is supplemented with a subsystem 101 for the efficient management of high-speed signals, both in terms of acquisition (capturing raw streams via one or more high-definition cameras) and in terms of control for a screen, for example. This subsystem, made up of one or more daughterboards, may be considered to be a particular PIU in terms of positioning in the architecture. One function of this subsystem 101 is, in particular, to take responsibility for the sensors and actuators with high transmission speeds which are present in the architecture and to retransmit the information to the central computer PCU with a view to the actual processing thereof (ability to transmit raw streams with low latency which are synchronized for certain processing operations sensitive to compression noise, for example). For example, such a subsystem is used in the case where the bitrate required for data transmission is higher than the maximum acceptable bitrate on the interconnection network 36. The use of this subsystem may also be advantageous in the case where the latency of the interconnection network 36 is too high with respect to the acceptable latency for the application.

However, given the potentially very high bitrates required, linking between the PCU 31 and this subsystem 101 may be preferred: for example, a high-speed input/output block 102 may be used to link the subsystem 101 to the PCU 31. This block makes it possible to position the subsystem 101 as a daughterboard of the PCU or to connect it to the PCU via high-speed serial link by wire if it is located remotely in the vehicle. This makes it possible to retain the properties of modularity of the architecture and the possibility of adapting the subsystem to the types of sensors or actuators, even when the vehicle is in use (for example, when updating the sensors in a retrofit). However, at the level of the functional aspect of the system, this subsystem 101 is fully integrated with the rest of the architecture so as to retain the advantageous properties of security, of data access control, and of management thereof by the data management block 502 and the synchronization block 501 in particular. Thus, while favored, this link does not negate the properties of the overall architecture with respect to this input and output subsystem. In the example of FIG. 10, high-speed cameras 103 are linked directly to the subsystem within the context of the acquisition of signals for driving assistance. The images are processed by a daughterboard 51. The data are managed by the DMM 502 and SM 501 functional blocks, with attribute-based data protection. The link between the subsystem 101 and the PCU 31 is, for example, a high-speed link using a protocol passing through a certified automotive connector in the context of a motherboard-daughterboard link, unlike the PIUs which are, for example, on an Ethernet or other type of link. However, it may be noted that both types of link arrive at the communication infrastructure 55 of the motherboard of the PCU which is a deterministic communication network, the overall architecture making it possible to maintain the properties of synchronization between the various elements.

The invention claimed is:

1. An electronic architecture embedded in a system carrying out the management of the functions of said system, said functions being implemented via a set of sensors and actuators, comprising at least:
a central computer, wherein said central computer is composed of a motherboard and of computing subsystems, each subsystem comprising one or more processors which are coupled to a private memory and are capable of executing a plurality of software partitions, said subsystems communicating with one another and with said communication network by means of an interconnection infrastructure implemented on said motherboard;
a real-time communication network;
a set of interface modules each assigned to a geographical area of said system, wherein the geographical area is associated with a plurality of components of said system, each module:
aggregating signals from at least one of said sensors of the area assigned thereto and sending said signals to said central computer via said communication network;
and/or distributing control signals to at least one of said actuators of the area assigned thereto; and
a centralized functional block for managing data allowing access to the data of the memories present in the central computer and in said interface modules, said centralized functional block providing the various components of said electronic architecture with unified access to the data related to the sensors and actuators distributed in said system and to the data generated by said computing subsystems,
said central computer driving said actuators according to the signals from said sensors, the control signals for said actuators being sent to said interface modules via said communication network, at least one of said interface modules aggregating the signals from sensors of a plurality of functional domains and/or distributes commands to actuators of the plurality of functional domains, said sensors of the plurality of functional domains and actuators of the plurality of functional domains being located in the geographical area assigned to said at least one module.

2. The architecture as claimed in claim 1, wherein at least one of said interface modules also aggregates signals from at least one of said actuators and/or distributes signals to at least one of said sensors.

3. The architecture as claimed in claim 1, wherein said functional block is implemented by means of a distributed memory service virtually shared between said computer and said modules, such that all communications of said central computer with said sensors and actuators pass through said virtual memory and such that the memories distributed in said architecture and all of the sensors and actuators appear to said central computer as a single shared memory.

4. The architecture as claimed in claim 3, wherein said functional block makes it possible to secure the access to the data via the use of attributes associated with the data.

5. The architecture as claimed in claim 1, comprising a functional block that provides synchronization between said computing subsystems.

6. The architecture as claimed in claim 1, comprising a functional block that provides and supports the services linked to the operational dependability of said system.

7. The architecture as claimed in claim 1, wherein an interface module comprises at least:
a communication processor;
communication interfaces between said processor and actuators and/or sensors;
a communication interface between said processor and said communication network; said communication processor having the function of arranging the data from said sensors into packets in order to transmit them to said central computer via said communication network and to distribute the command data from said central computer, via said communication network, to said actuators.

8. The architecture as claimed in claim 7, wherein said communication interfaces between said processor and said actuators and/or sensors being of different types, said processor translates communication protocols of said interfaces in order to exchange said data with said central computer according to a single protocol.

9. The architecture as claimed in claim 1, comprising at least one gateway able to connect said communication network to at least one other communication network.

10. The architecture as claimed in claim 9, comprising a secondary computer communicating with said communication network by means of said gateway, said secondary computer driving functions which are connected to said other network.

11. The architecture as claimed in claim 1, comprising a combination of techniques in addition to the execution of a plurality of software partitions, said combination forming virtual domains, each virtual domain covering at least one of said partitions processing the interface modules of a group of sensors and actuators.

12. The architecture as claimed in claim 11, wherein said combination comprises a combination of data transfer segregation mechanisms in said real-time communication network.

13. The architecture as claimed in claim 11, wherein said combination is based on data attributes placed by said interface modules.

14. The architecture as claimed in claim 11, wherein the communication between said central computer and said interface modules are controlled by said computer.

15. The architecture as claimed in claim 1, comprising a subsystem for managing the input and output signals with high transmission speeds, which is connected to the interconnection infrastructure of said motherboard, said subsystem being composed of one or more daughterboards and performing the function of an interface module between sensors and/or actuators with high transmission speeds and said central computer.

16. The architecture as claimed in claim 1, wherein said communication network is of deterministic Ethernet type.

\* \* \* \* \*